United States Patent [19]

Teske

[11] Patent Number: 4,496,272

[45] Date of Patent: Jan. 29, 1985

[54] ROTARY ARM-TYPE UNLOADER FOR BULK-STORAGE BIN

[76] Inventor: Lothar Teske, Hegelstrasse 15, D-5000 Köln 90, Fed. Rep. of Germany

[21] Appl. No.: 491,084

[22] Filed: May 3, 1983

[30] Foreign Application Priority Data

May 5, 1982 [DE] Fed. Rep. of Germany ....... 3216795

[51] Int. Cl.³ .............................................. B65G 65/00
[52] U.S. Cl. ..................................... 414/323; 74/128; 222/63; 414/786
[58] Field of Search ............... 414/292, 304, 323, 325, 414/786; 222/334, 410, 63; 74/128; 239/684

[56] References Cited

U.S. PATENT DOCUMENTS

| | | | |
|---|---|---|---|
| 2,947,187 | 8/1960 | Graff et al. | 74/128 X |
| 3,927,774 | 12/1975 | Teske et al. | 414/325 X |
| 4,083,462 | 4/1978 | Teske et al. | 414/323 X |

FOREIGN PATENT DOCUMENTS 2364830  7/1976  Fed. Rep. of Germany .

Primary Examiner—Robert J. Spar
Assistant Examiner—Stuart Millman
Attorney, Agent, or Firm—Karl F. Ross

[57] ABSTRACT

An unloading apparatus comprises a housing vertically spaced from the port in the bin containing the material to be unloaded, a shaft defining and rotatable about an upright axis generally at the port, at least one arm extending at least generally radially from the shaft and being sweepable through the material and over the port on rotation of the shaft, a toothed drive wheel centered on the axis and fixed on the shaft, and first and second pairs of actuators each having an outer end pivoted on the housing and an inner end constituted as a pusher engageable tangentially with the teeth of the wheel. These actuators are generally angularly equispaced around the axis and the actuators of the first pair alternate with those of the second pair. The first-pair actuators with their pushers in force-transmitting engagement with the wheel are extended while contracting the second-pair actuators and alternately therewith the first-pair actuators are contracted while extending the second-pair actuators with their pushers in force-transmitting engagement with the wheel, with the contraction stroke of each pair commencing after the start of and terminating before the end of the expansion stroke of the other pair. Thus before each alternation all of the actuators are in force-transmitting engagement with the wheel.

8 Claims, 2 Drawing Figures

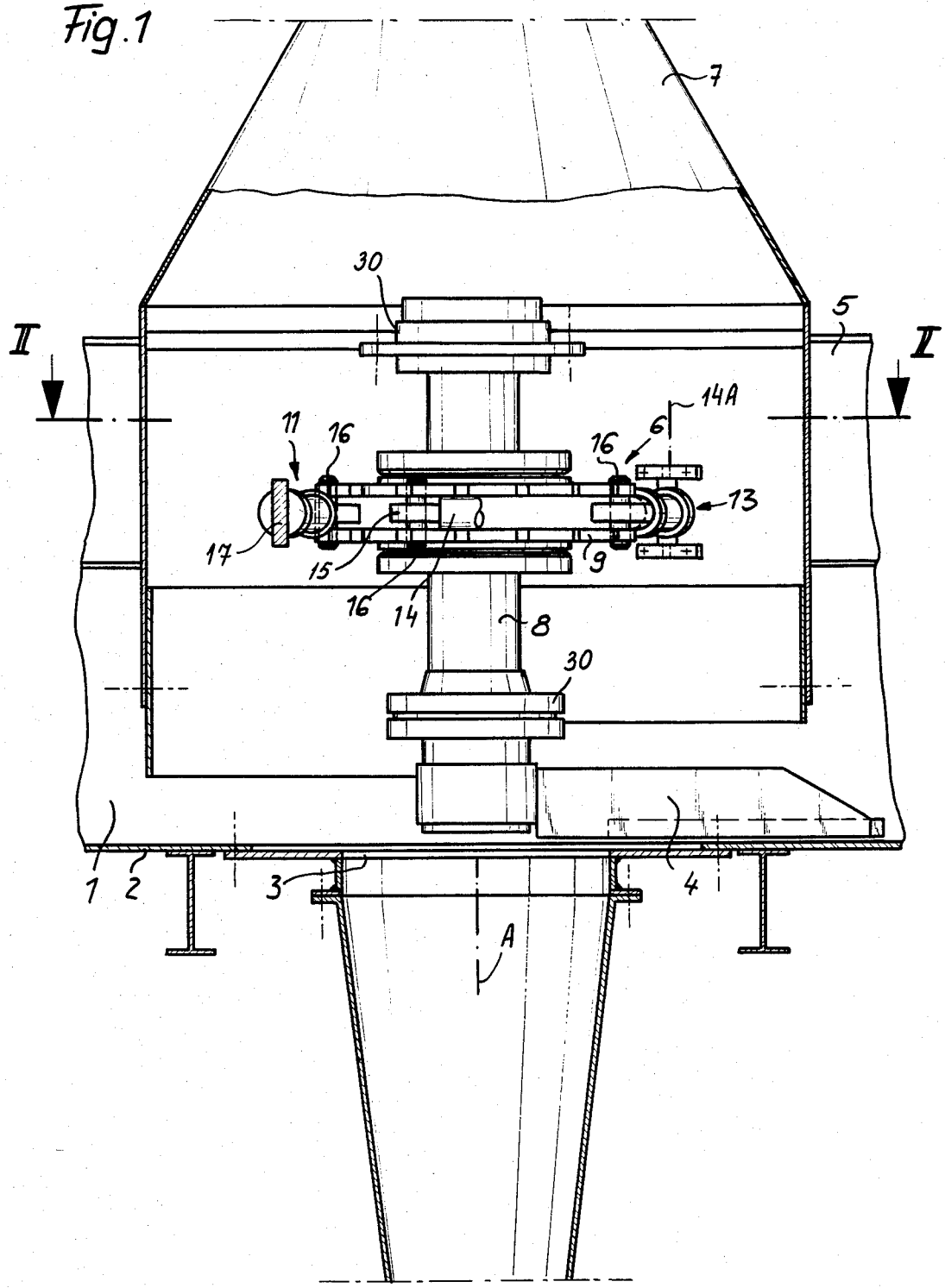

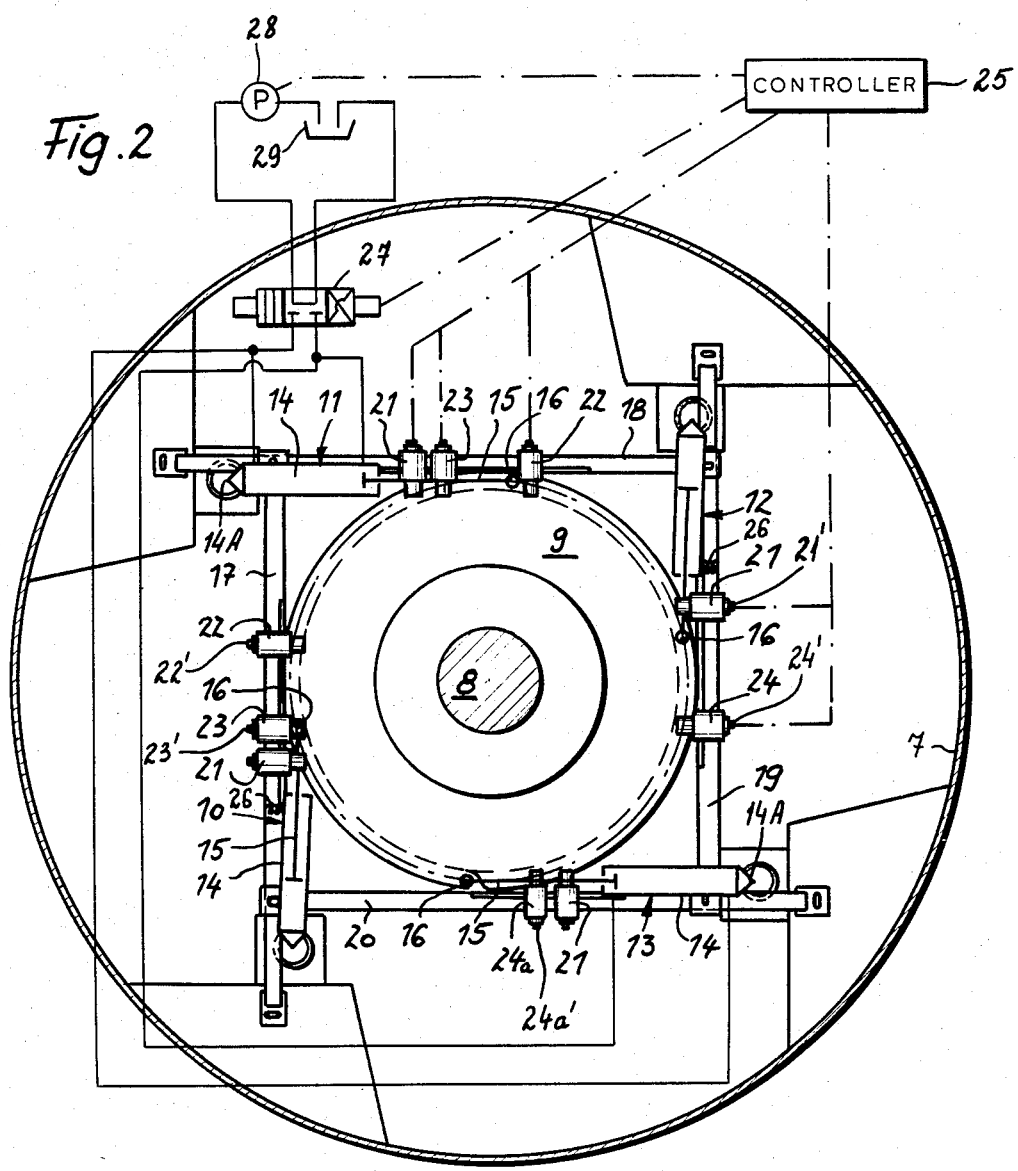

4,496,272

ROTARY ARM-TYPE UNLOADER FOR BULK-STORAGE BIN

FIELD OF THE INVENTION

The present invention relates to a rotary arm-type unloader for a bulk-storage bin. More particularly this invention concerns a drive for rotating such an unloader.

BACKGROUND OF THE INVENTION

An arm-type unloader wheel as described in my U.S. Pat. No. 4,320,828 is held under a dome in the bottom of a bulk-storage bin, generally above a discharge port of same. The wheel is rotated so its arm or arms engage out past the dome into the bottom of the mass of bulk material in the bin, loosening this material so it flows, and simultaneously sweeping it into the discharge port. Two such wheels can be provided flanking the discharge port, or this port can be positioned eccentrically underneath a single wheel.

In German patent document No. 2,364,830 (and corresponding U.S. Pat. No. 3,927,774) there is described a system wherein the unloader wheel is carried on a vertical shaft provided below the wheel with a hook-tooth sprocket that cooperates with a pair of drive units each including a double-acting hydraulic cylinder having an outer end pivoted about a vertical axis on the machine frame and an inner end carrying a pusher element engageable behind the teeth of the sprocket. These inner ends are biased radially inward so the pusher elements engage the sprocket's periphery.

In this earlier system the cylinders were expanded and contracted alternately so that the one cylinder would be expanding while engagement with the sprocket to rotate the wheel while the other cylinder was contracting to get back into a starting position. Such style of operation on the one hand leads to irregular displacement of the unloading arm or arms, sometimes fast and sometimes slow. In addition it exerts considerable radial forces on the shaft of the unloader so that same must be very massively constructed and mounted in extremely robust bearings. Furthermore it is necessary to use a very powerful actuator in order to break the arm free at the start of operation, even though once the unloader has started it can be driven with much less force.

OBJECTS OF THE INVENTION

It is therefore an object of the present invention to provide an improved unloading apparatus and method.

Another object is the provision of such an unloading apparatus and method which overcome the above-given disadvantages, that is which operate smoothly and easily.

A further object is the provision of an apparatus which can be started up even when the material engaging the unloader arm or arms is packed in place.

SUMMARY OF THE INVENTION

These objects are attained according to the instant invention in an apparatus which comprises a housing vertically spaced from the port in the bin containing the material to be unloaded, a shaft defining and rotatable about an upright axis generally at the port, at least one arm extending at least generally radially from the shaft and being sweepable through the material and over the port on rotation of the shaft, a toothed drive wheel centered on the axis and fixed on the shaft, and first and second pairs of actuators each having an outer end pivoted on the housing and an inner end constituted as a pusher engageable tangentially with the teeth of the wheel. These actuators are generally angularly equispaced around the axis and the actuators of the first pair alternate with those of the second pair. According to this invention the first-pair actuators with their pushers in force-transmitting engagement with the wheel are extended while contracting the second-pair actuators and alternately therewith the first-pair actuators are contracted while extending the second-pair actuators with their pushers in force-transmitting engagement with the wheel, with the contraction stroke of each pair commencing after the start of and terminating before the end of the expansion stroke of the other pair. Thus before each alternation all of the actuators are in force-transmitting engagement with the wheel.

With this system, therefore, two normally diametrically opposite actuators engage the drive wheel at any time, so there is no radial component to the force they exert. Thus the shaft need not be designed to withstand this force. In addition this system, with the overlap in the stroke between the two pairs of actuators ensuring continuous smooth movement at a constant speed.

This overlap is achieved principally by retracting the actuators at a speed which is substantially faster than the speed at which they are expanded, so that during the expansion stroke of the one pair the other pair has ample time to retract completely and start expanding again.

It should also be noted that intead of two pairs it would be within the scope of this invention to have three pairs, or to have each set include three or more angularly equispaced actuators all operated together.

According to a feature of this invention the control means includes noncontacting position detectors positioned along the periphery of the wheel. These position detectors coact with the pushers. In addition the position detectors are adjustably mounted on the housing and can be fixed at any of a plurality of locations at least generally angularly offset from one another about the wheel. Thus one detects the positions of the pushers and alternates between contraction and extension in accordance with the detected positions.

In accordance with another feature of this invention the displacement of the wheel is only started and stopped when all actuators are in force-transmitting engagement with the wheel. Thus in a four-actuator system it is possible to bring all four actuators to bear on the drive wheel to start the system up, thereby allowing relatively light actuators to be used.

These actuators are like fluid cylinders that are all pressurized with the same pressure when they are all in force-transmission engagement with the wheel. This is most simply done by connecting each pair to its own hydraulic circuit, and connecting the two circuits together during the two periods of each cycle that all actuators act synchronously and jointly. Such splitting of the circuits eliminates the possibility of all the fluid flowing to the contracting pair rather than to the expanding pair.

Normally only one end-position sensor is provided for each actuator pair. Thus when the one actuator reaches its end position, both actuators of the pair are reversed. This system recommends itself for simplicity.

DESCRIPTION OF THE DRAWINGS

The above and other features and advantages will become more readily apparent from the following, reference being made to the accompanying drawings in which:

FIG. 1 is a vertical section through the apparatus according to the invention; and FIG. 2 is a partly diagrammatic horizontal section taken along line II—II of FIG. 1.

SPECIFIC DESCRIPTION

As seen in FIGS. 1 and 2 a storage bin 1 of the type, for instance, described in my application Ser. No. 386,594 filed June 9, 1982 or in my U.S. Pat. No. 4,249,845 has a floor 2 formed with a vertically throughgoing discharge port 3 centered on an upright axis A underneath a loading apparatus. A traverse 5, which may be large enough for a man to crawl through, supports a housing 7 with an upwardly pointed dome roof above this port 3.

A shaft 8 is supported inside this housing 7 for rotation about the axis A. At its lower end it carries one or more radially extending loading arms 4 that project out from beneath the housing 1. In known manner this arm 4 breaks up any clumps of the bulk material in the hopper 1 and allows the material to flow out the port 3.

Above the arm 4 the shaft 8 is provided with a large hook-toothed ratchet wheel 9 of construction similar to that described in the above-cited German patent document, that is having a pair of axially spaced plates formed with axially aligned hooked teeth as partly visible in FIG. 1. A drive 6 is provided with four angularly equispaced double-effect actuators 10, 11, 12, and 13 each having a cylinder 14 pivoted on the housing 7 at a respective axis 14A and a piston rod 15 carrying a transverse pusher pin 16 engageable with the teeth of the wheel 9. Springs indicated diagrammatically at 26 urge the inner piston-rod ends radially inward so the pushers 16 ride on the periphery of the wheel 9.

Further according to this invention the housing 7 supports four identical support rods 17, 18, 19, and 20 lying level with the wheel 9 in a plane perpendicular to the axis 8 and forming a square centered on the axis A and having corners generally at the axes 14A and sides tangent to the wheel 9. Thus each rod 17-20 extends generally parallel to the respective actuator 10-13 and in fact lies perfectly parallel thereto in a central position of same.

These rods 17-20 each carry a position detector 21 which responds when the respective actuators 10-13 are fully contracted, that is when all the pushers 16 are contracted fully counterclockwise. The rods 17 and 18 also each carry a position detector 22 that responds when the respective actuators 10 and 11 are fully extended and position detectors 23 which respond when the respective pushers 16 are seated fully behind a tooth of the wheel 9. Finally position detectors 24 and 24' are provided on the rails 19 and 20 that generate an output when the respective pushers 16 are in positions engaged with the wheel 9 and slightly ahead of the fully extended and fully contracted positions. These detectors 21-24' are mounted by respective screws 21'-24a' on the rails 17-20 so they can be moved therealong to adjust the below-described operation. They are of the noncontacting type, normally constituted by reed switches actuated by magnets carried on the respective pushers 16.

As mentioned above the actuators 10-13 are double-acting and are normally operated with medium pressure in pairs, with the actuator 10 moving jointly and synchronously with the actuator 12 and the actuators 13 similarly paired. A controller 25 is connected to all of the detectors 21-24a to receive their outputs and is connected to a four-port three-position slide valve 27 for each actuator pair 11, 13 and 10, 12, only the valve 27 for the pair 11, 13 being shown here. This valve 27 is connected on one side to the front and rear compartments of the respective cylinders 14 and on the other side to a dual-pressure high-pressure source here indicated by a pump 28 and to a sump 29. In the central position of each valve 27 flow into and out of the respective cylinders is impossible, in the one end position the cylinders are extended, and in the opposite end position they are contracted.

FIG. 2 shows the actuator pair 11, 13 almost fully extended and the pair 10, 12 only slightly extended. Starting from this position the device operates as follows:

All of the rear compartments of the cylinders 14, that is those compartments closer to the axes 14A, are identically pressurized. Thus each pusher 16 will push against the back of a tooth and the wheel 9 will be rotated with great force, and with virtually no stress to the bearings 30 supporting the shaft 9 on the housing 7. Enough force can easily be exerted in this mode when being driven by all four actuators 10-13 to start the arm 4 moving from a standstill even in relatively packed material.

When the pusher 16 reaches its outer end position the position detector 22 on the bar 18 signals this fact to the controller 25 which reverses the valve 27 for the two actuators 11 and 13, pressurizing their front compartments instead of their rear compartments. Since the piston rods 15 pass through these front compartments the effective piston areas exposed in them are smaller than in the rear ports. Thus assuming virtually no resistance to contraction, when the front compartments are pressurized with the same pressure that was just applied to the rear compartments, the actuators 11 and 13 move back into their inner positions with much greater speed than that at which they moved in the opposite direction.

When the two position detectors 21 of the actuator pair 11, 13 indicate that the respective pushers are back in their innermost positions aligned behind teeth of the wheel 9 the pressurization of these actuators 11 and 13 is again reversed, the respective pushers 16 being initially moved at high speed to bring them into force-transmitting engagement with the wheel 9. Once the position detector 23 indicates that the actuator 11, and hence the synchronous actuator 13, is in such force-transmitting engagement its rear compartment is pressurized at the same level as those of the actuators 10 and 12 which meanwhile have been rotating the wheel 9 at a constant speed. Such identical pressurization is most simply achieved merely by connecting together the two hydraulic circuits 27-29 for the two pairs 11, 13 and 10, 12.

Operation is so timed that only after the pushers 16 of the actuators 11 and 13 are back at the beginnings of their outward strokes and in force-transmitting engagement with the wheel 9 do the actuators 10 and 12 reach the outer ends of their strokes. This is signaled by the sensor 22 of the actuator 10. Thereupon these actuators 10 and 12 are contracted and re-engaged with the wheel 9 in the manner described above for the actuators 11 and 13, while these actuators 11 and 13 smoothly and uniformly pivot the arm 4.

Thus according to this invention for a time between changeover from one set of actuators to the other the system is driven by all four actuators. The position detectors 24 and 24a are provided to detect these intervals when all four actuators are in force-transmitting engagement with the wheel 9, and only allow the apparatus to be shut down when all four are in such engagement. Thus when the system is restarted all four actuators 10–13 will be applied to the job of breaking free the arm 4.

Normally a separate hydraulic circuit is provided for each actuator pair 11, 13 or 10, 12. When the system is operated with all four actuators a crossover valve connects the high-pressure lines for the rear compartments together, twinning these two circuits. This style of operation ensures that, so long as the actuator hardware is identical, perfectly synchronous action is assured.

I claim:

1. An apparatus for unloading bulk material from a bin having a floor formed with a discharge port, the apparatus comprising:
    a housing vertically spaced from the port in the bin;
    a shaft defining and rotatable about an upright axis generally at the port;
    at least one arm extending at least generally radially from the shaft and being sweepable through the material and over the port on rotation of the shaft;
    a toothed drive wheel centered on the axis and fixed on the shaft;
    first and second pairs of actuators each having an outer end pivoted on the housing and an inner end constituted as a pusher engageable tangentially with the teeth of the wheel, the actuators being generally angularly equispaced around the axis and the actuators of the first pair alternating with those of the second pair; and
    control means for extending the first-pair actuators with their pushers in force-transmitting engagement with the wheel while contracting the second-pair actuators and for alternately contracting the first-pair actuators while extending the second-pair actuators with their pushers in force-transmitting engagement with the wheel, with the contraction stroke of each pair commencing after the start of and terminating before the end of the expansion stroke of the other pair, whereby before each alternation all of the actuators are in force-transmitting engagement with the wheel.

2. The unloading apparatus according to claim 1 wherein the control means includes noncontacting position detectors positioned along the periphery of the wheel.

3. The unloading apparatus according to claim 2 wherein the position detectors coact with the pushers.

4. The unloading apparatus according to claim 2 wherein the position detectors are adjustably mounted on the housing and can be fixed at any of a plurality of locations at least generally angularly offset from one another about the wheel.

5. A method of unloading bulk material from a bin having a floor formed with a discharge port, with an apparatus having:
    a housing vertically spaced from the port in the bin;
    a shaft defining and rotatable about an upright axis generally at the port;
    at least one arm extending at least generally radially from the shaft and being sweepable through the material and over the port on rotation of the shaft;
    a toothed drive wheel centered on the axis and fixed on the shaft; and
    first and second pairs of actuators each having an outer end pivoted on the housing and an inner end constituted as a pusher engageable tangentially with the teeth of the wheel, the actuators being generally angularly equispaced around the axis and the actuators of the first pair alternating with those of the second pair;
the method comprising the steps of:
    extending the first-pair actuators with their pushers in force-transmitting engagement with the wheel while contracting the second-pair actuators; and
    alternately contracting the first-pair actuators while extending the second-pair actuators with their pushers in force-transmitting engagement with the wheel, with the contraction stroke of each pair commencing after the start of and terminating before the end of the expansion stroke of the other pair.

6. The unloading method defined in claim 5, further comprising the step of:
    detecting the positions of the pushers and alternating between contraction and extension in accordance with the detected positions.

7. The unloading method defined in claim 5, further comprising the step of:
    starting and stopping displacement of the wheel only when all actuators are in force-transmitting engagement with the wheel.

8. The unloading method defined in claim 5 wherein the actuators are like fluid cylinders that are all pressurized with the same pressure when they are all in force-transmission engagement with the wheel.

* * * * *